United States Patent
Guim Bernat et al.

(10) Patent No.: US 10,346,091 B2
(45) Date of Patent: Jul. 9, 2019

(54) FABRIC RESILIENCY SUPPORT FOR ATOMIC WRITES OF MANY STORE OPERATIONS TO REMOTE NODES

(71) Applicant: Intel Corporation, Santa Clara, CA (US)

(72) Inventors: Francesc Guim Bernat, Barcelona (ES); Thomas Willhalm, Sandhausen (DE); Karthik Kumar, Chandler, AZ (US); Martin P. Dimitrov, Chandler, AZ (US); Raj K. Ramanujan, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 213 days.

(21) Appl. No.: 15/324,107

(22) PCT Filed: Mar. 31, 2016

(86) PCT No.: PCT/US2016/025299
§ 371 (c)(1),
(2) Date: Jan. 5, 2017

(87) PCT Pub. No.: WO2017/171798
PCT Pub. Date: Oct. 5, 2017

(65) Prior Publication Data
US 2018/0329650 A1    Nov. 15, 2018

(51) Int. Cl.
*G06F 3/06* (2006.01)
*G06F 12/0815* (2016.01)

(52) U.S. Cl.
CPC ............ *G06F 3/0659* (2013.01); *G06F 3/067* (2013.01); *G06F 3/0619* (2013.01);
(Continued)

(58) Field of Classification Search
CPC ...... G06F 3/0619; G06F 3/067; G06F 3/0625; G06F 3/0656; G06F 3/0688; G06F 12/0815
(Continued)

(56) References Cited

U.S. PATENT DOCUMENTS 6,961,806 B1    11/2005   Agesen et al.
7,318,126 B2 *   1/2008   Finkler ................. G06F 9/5016
                                                   711/141
(Continued)

FOREIGN PATENT DOCUMENTS

WO    2007/124384 A1    11/2007
WO    2017/117321 A2    7/2017
(Continued)

OTHER PUBLICATIONS

International Search Report and Written Opinion for International Application No. PCT/US2016/025299, dated Dec. 22, 2016.
(Continued)

*Primary Examiner* — Pierre Miche Bataille
(74) *Attorney, Agent, or Firm* — Spectrum IP Law Group LLC

(57) ABSTRACT

Methods and apparatus related to fabric resiliency support for atomic writes of many store operations to remote nodes are described. In one embodiment, non-volatile memory stores data corresponding to a plurality of write operations. A first node includes logic to perform one or more operations (in response to the plurality of write operations) to cause storage of the data at a second node atomically. The plurality of write operations are atomically bound to a transaction and the data is written to the non-volatile memory in response to release of the transaction. Other embodiments are also disclosed and claimed.

17 Claims, 9 Drawing Sheets

(52) U.S. Cl.
CPC .......... *G06F 3/0625* (2013.01); *G06F 3/0656* (2013.01); *G06F 3/0688* (2013.01); *G06F 12/0815* (2013.01); *G06F 2212/621* (2013.01); *Y02D 10/154* (2018.01)

(58) Field of Classification Search
USPC ........................................................ 711/154
See application file for complete search history.

(56) References Cited

U.S. PATENT DOCUMENTS

| | | | |
|---|---|---|---|
| 7,613,882 | B1 | 11/2009 | Akkawi et al. |
| 8,838,430 | B1 | 9/2014 | Tuay-Ling et al. |
| 9,910,753 | B1* | 3/2018 | Tringale .............. G06F 11/3006 |
| 2008/0034355 | A1 | 2/2008 | Shen et al. |
| 2010/0318394 | A1 | 12/2010 | Nayak et al. |
| 2011/0219145 | A1 | 9/2011 | Pope et al. |
| 2012/0117334 | A1 | 5/2012 | Sheaffer et al. |
| 2013/0243003 | A1 | 9/2013 | Oda |
| 2013/0311733 | A1 | 11/2013 | Miller et al. |
| 2014/0379997 | A1 | 12/2014 | Blaner et al. |
| 2015/0301942 | A1* | 10/2015 | Jernigan, IV ....... G06F 12/0804 711/143 |
| 2015/0331798 | A1 | 11/2015 | Guthrie et al. |
| 2017/0083539 | A1* | 3/2017 | Saxena .............. G06F 17/30174 |
| 2017/0187805 | A1 | 6/2017 | Bernet et al. |
| 2018/0004454 | A1* | 1/2018 | Sampathkumar ....... G06F 3/061 |

FOREIGN PATENT DOCUMENTS

| | | | |
|---|---|---|---|
| WO | 2017/117321 | A3 | 7/2017 |
| WO | 2017/171798 | A1 | 10/2017 |

OTHER PUBLICATIONS

International Preliminary Report on Patentability for International Patent Application No. PCT/US2016/025299, dated Oct. 11, 2018, 11 pages.
Office Action issued for U.S. Appl. No. 14/983,087, dated Oct. 3, 2018, 17 pages.
Office Action issued for U.S. Appl. No. 14/983,087, dated Feb. 8, 2018, 21 pages.
International Search Report and Written Opinion for International Application No. PCT/US2016/069066, dated Apr. 13, 2017, 15 pages.

* cited by examiner

FABRIC RESILIENCY SUPPORT FOR ATOMIC WRITES OF MANY STORE OPERATIONS TO REMOTE NODES

FIELD

The present disclosure generally relates to the field of electronics. More particularly, some embodiments generally relate to fabric resiliency support for atomic writes of many store operations to remote nodes.

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during the run-time of the program. On the other hand, persistent data structures stored in non-volatile (or persistent memory) are available beyond the run-time of a program and can be reused.

As computing capabilities are enhanced in processors, one concern is the speed at which memory may be accessed by a processor. For example, to process data, a processor may need to first fetch data from a memory. After completion of the data processing, the results may need to be stored in the memory. Therefore, the memory access speed can have a direct effect on overall system performance.

Another important consideration is power consumption. For example, in mobile computing devices that rely on battery power, it is very important to reduce power consumption to allow for the device to operate while mobile. Power consumption is also important for non-mobile computing devices (such as computer servers, e.g., used in a data center, etc.) as excess power consumption may increase costs (e.g., due to additional power usage, increased cooling requirements, etc.), shorten component life, or limit locations at which a device may be used.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
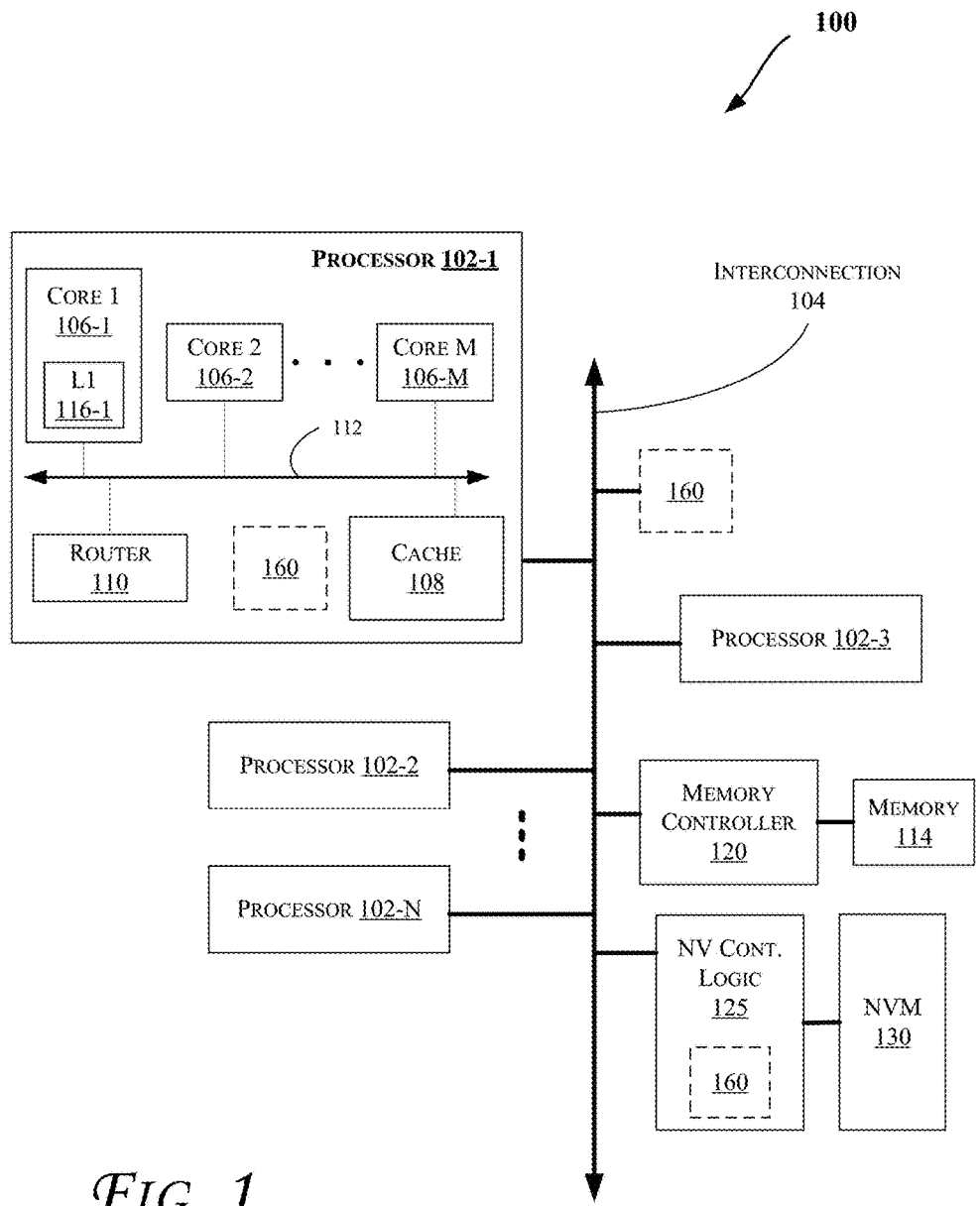
FIGS. 1 and 3-5 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

In today's systems, applications may have a working copy of the data in memory and a durable copy of the data on disk (or some other non-volatile memory). With Persistent Memory (PM), one promise is that applications can have the working copy of the data also be the durable copy. However, with this approach, it is required that the working copy be in a constant consistent state, even in case of a power failure. Moreover, there are many scenarios where changes need to be made atomically to a group of physical addresses. Unfortunately, using current techniques, one cannot always guarantee atomicity (where atomicity generally refers to all or nothing being written to persistent memory) for a set of memory write operations as will be further discussed below.

Some embodiments relate to fabric resiliency support for atomic writes of many store operations to remote nodes. As discussed herein, a remote node generally refers to a node that is reachable over a network link (or even across a network switch or hub). Also, a node generally refers to computing device (e.g., including a storage device or memory). In an embodiment, logic (e.g., hardware logic) is able to assist software in committing a group of write operations atomically (all or nothing) to persistent memory. More particularly, at least some embodiments provide new hardware and new software interface(s) that allow fair and/or flexible provisioning of memory bandwidths in multiple domains and/or system without storage (e.g., Non-Uniform Memory Access (NUMA) systems).

Furthermore, even though some embodiments are generally discussed with reference to Non-Volatile Memory (NVM), embodiments are not limited to a single type of NVM and non-volatile memory of any type or combinations of different NVM types (e.g., including NAND and/or NOR type of memory cells) or other formats usable for memory) may be used. The memory media (whether used in DIMM (Dual Inline Memory Module) format or otherwise) can be any type of memory media including, for example, one or more of: nanowire memory, Ferro-electric Transistor Random Access Memory (FeTRAM), Magnetoresistive Random Access Memory (MRAM), multi-threshold level NAND flash memory, NOR flash memory, Spin Torque Transfer Random Access Memory (STTRAM), Resistive Random Access Memory, byte addressable 3-Dimensional Cross Point Memory, single or multi-level PCM (Phase Change Memory), memory devices that use chalcogenide phase change material (e.g., chalcogenide glass) or "write in place" non-volatile memory. Also, any type of Random Access Memory (RAM) such as Dynamic RAM (DRAM), backed by a power reserve (such as a battery or capacitance) to retain the data, may provide an NV memory solution. Volatile memory can include Synchronous DRAM (SDRAM). Hence, even volatile memory capable of retaining data during power failure or power disruption(s) may be used for memory in various embodiments.

The techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, smart bracelet, etc.), including those discussed with reference to FIGS. 1-5. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a processor cache 108 (which may be a shared cache or a private cache in various embodiments), and/or a router 110. The processor cores 106 may be implemented on a single integrated circuit (IC) chip. Moreover, the chip may include one or more shared and/or private caches (such as processor cache 108), buses or interconnections (such as a bus or interconnection 112), logic 120, memory controllers (such as those discussed with reference to FIGS. 3-5), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The processor cache 108 may store data (e.g., including instructions) that are utilized by one or more components of the processor 102-1, such as the cores 106. For example, the processor cache 108 may locally cache data stored in a memory 114 for faster access by the components of the processor 102. As shown in FIG. 1, the memory 114 may be in communication with the processors 102 via the interconnection 104. In an embodiment, the processor cache 108 (that may be shared) may have various levels, for example, the processor cache 108 may be a mid-level cache and/or a last-level cache (LLC). Also, each of the cores 106 may include a level 1 (L1) processor cache (116-1) (generally referred to herein as "L1 processor cache 116"). Various components of the processor 102-1 may communicate with the processor cache 108 directly, through a bus (e.g., the bus 112), and/or a memory controller or hub.

As shown in FIG. 1, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

System 100 also includes NV memory 130 (or Non-Volatile Memory (NVM), e.g., compliant with NVMe (NVM express)) coupled to the interconnect 104 via NV controller logic 125. Hence, logic 125 may control access by various components of system 100 to the NVM 130. Furthermore, even though logic 125 is shown to be directly coupled to the interconnection 104 in FIG. 1, logic 125 may communicate via a storage bus/interconnect (such as the SATA (Serial Advanced Technology Attachment) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 3, 4, and/or 5), etc.). Additionally, logic 125 may be incorporated into memory controller logic (such as those discussed with reference to FIGS. 3-5) or provided on a same Integrated Circuit (IC) device in various embodiments (e.g., on the same IC device as the NVM 130 or in the same enclosure as the NVM 130). System 100 may also include other types of non-volatile memory such as those discussed with reference to FIGS. 3-5, including for example a hard drive, etc.

Figure 2A:
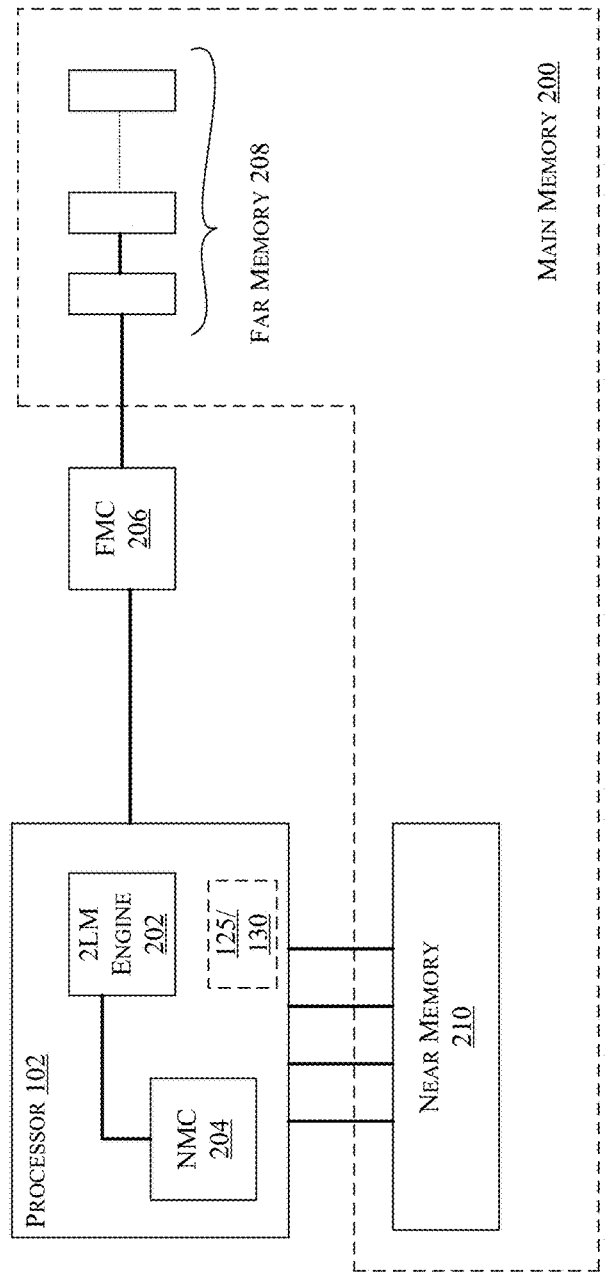
FIG. 2A illustrates a block diagram of a two-level system main memory, according to an embodiment.

FIG. 2A illustrates a block diagram of two-level system main memory, according to an embodiment. Some embodiments are directed towards system main memory 200 comprising two levels of memory (alternatively referred to herein as "2LM") that include cached subsets of system disk level storage (in addition to, for example, run-time data). This main memory includes a first level memory 210 (alternatively referred to herein as "near memory") comprising smaller faster memory made of, for example, volatile memory 114 (e.g., including DRAM (Dynamic Random Access Memory)), NVM 130, etc.; and a second level memory 208 (alternatively referred to herein as "far memory") which comprises larger and slower (with respect to the near memory) volatile memory (e.g., memory 114) or nonvolatile memory storage (e.g., NVM 130).

In an embodiment, the far memory is presented as "main memory" to the host Operating System (OS), while the near memory is a cache for the far memory that is transparent to the OS, thus rendering the embodiments described below to appear the same as general main memory solutions. The management of the two-level memory may be done by a combination of logic and modules executed via the host central processing unit (CPU) 102 (which is interchangeably referred to herein as "processor"). Near memory may be coupled to the host system CPU via one or more high bandwidth, low latency links, buses, or interconnects for efficient processing. Far memory may be coupled to the CPU via one or more low bandwidth, high latency links, buses, or interconnects (as compared to that of the near memory).

Referring to FIG. 2A, main memory 200 provides run-time data storage and access to the contents of system disk storage memory (such as disk drive 328 of FIG. 3 or data storage 448 of FIG. 4) to CPU 102. The CPU may include cache memory, which would store a subset of the contents of main memory 200. Far memory may comprise either volatile or nonvolatile memory as discussed herein. In such embodiments, near memory 210 serves a low-latency and high-bandwidth (i.e., for CPU 102 access) cache of far memory 208, which may have considerably lower bandwidth and higher latency (i.e., for CPU 102 access).

In an embodiment, near memory 210 is managed by Near Memory Controller (NMC) 204, while far memory 208 is managed by Far Memory Controller (FMC) 206. FMC 206 reports far memory 208 to the system OS as main memory (i.e., the system OS recognizes the size of far memory 208 as the size of system main memory 200). The system OS and system applications are "unaware" of the existence of near memory 210 as it is a "transparent" cache of far memory 208.

CPU 102 further comprises 2LM engine module/logic 202. The "2LM engine" is a logical construct that may comprise hardware and/or micro-code extensions to support two-level main memory 200. For example, 2LM engine 202 may maintain a full tag table that tracks the status of all architecturally visible elements of far memory 208. For example, when CPU 102 attempts to access a specific data segment in main memory 200, 2LM engine 202 determines whether the data segment is included in near memory 210; if it is not, 2LM engine 202 fetches the data segment in far memory 208 and subsequently writes the data segment to near memory 210 (similar to a cache miss). It is to be understood that, because near memory 210 acts as a "cache" of far memory 208, 2LM engine 202 may further execute data perfecting or similar cache efficiency processes.

Further, 2LM engine 202 may manage other aspects of far memory 208. For example, in embodiments where far memory 208 comprises nonvolatile memory (e.g., NVM 130), it is understood that nonvolatile memory such as flash is subject to degradation of memory segments due to significant reads/writes. Thus, 2LM engine 202 may execute functions including wear-leveling, bad-block avoidance, and the like in a manner transparent to system software. For example, executing wear-leveling logic may include selecting segments from a free pool of clean unmapped segments in far memory 208 that have a relatively low erase cycle count.

In some embodiments, near memory 210 may be smaller in size than far memory 208, although the exact ratio may vary based on, for example, intended system use. In such embodiments, it is to be understood that because far memory 208 may comprise denser and/or cheaper nonvolatile memory, the size of the main memory 200 may be increased cheaply and efficiently and independent of the amount of DRAM (i.e., near memory 210) in the system.

In one embodiment, far memory 208 stores data in compressed form and near memory 210 includes the corresponding uncompressed version. Thus, when near memory 210 request content of far memory 208 (which could be a non-volatile DIMM in an embodiment), FMC 206 retrieves the content and returns it in fixed payload sizes tailored to match the compression algorithm in use (e.g., a 256B transfer).

As mentioned before, there are many scenarios where changes need to be made atomically to a group of physical addresses. Unfortunately, using current techniques, one cannot always guarantee atomicity (where atomicity generally refers to all or none of data being written to persistent memory) for a set of memory write operations as will be further discussed below. To illustrate this point, consider the following example. An application uses an array/vector to represent an arbitrarily large number. When modifying the large number, an update of multiple entries in the array/vector may take place. If a power-failure is encountered in the midst of these updates, the large number could be left in an in inconsistent state upon restart (since memory that stored the large number is not persistent). This is going to be an important requirement for a range of applications that may be re-designed for persistent memory.

Further, some current implementations for persistent memory may allow software to have the ability to ensure that data is safely committed to persistent memory. It may achieve this by the use of new instruction(s) (such as CLFLUSHOPT and PCOMMIT), which flush data from the volatile caches/memory to the persistent memory. With the use of these new instruction(s) along with a FENCE (a type of software barrier), software may be able to guarantee that all prior write operations to persistent memory have reached persistency. Unfortunately, using the above mentioned instructions, one cannot always guarantee atomicity (where atomicity generally refers to all or none of the data being written to persistent memory) for a set of memory write operations.

Moreover, using the above-mentioned instructions (such as CLFLUSHOPT and PCOMMIT), one cannot always guarantee atomicity (all or nothing is written to persistent memory) for a set of memory writes. To illustrate why this is a problem, consider the following example. In the example, we want to update two variables A and B, which are parts of a struct that represents a large number. Specifically, either both A and B have to be stored in persistent memory together or both are left intact (or not stored in persistent memory), e.g., the "atomicity requirement".

TABLE 1

| Step | Operation | Comment |
| --- | --- | --- |
| 1 | A = A_new | Value of A updated in cache |
| 2 | B = B_new | Value of B updated in cache |
| 3 | CLFLUSHOPT A | A flushed from the cache |
| 4 | CLFLUSHOPT B | B flushed from the cache |
| 5 | SFENCE | Steps 1-4 are guaranteed to have completed. |
| 6 | PCOMMIT | A, B flushed from memory controller buffers to PM. |
| 7 | SFENCE | Step 7 is guaranteed to have completed. |

Considering the above example, a power failure could occur in a time window after step 1 and before step 7. At the time of power failure, any one of the following scenarios could occur:

1) Neither A nor B have been stored in persistent memory
2) Only A is stored in persistent memory
3) Only B is stored in persistent memory
4) Both A and B are stored in persistent memory.

These scenarios could happen during instruction execution re-ordering and non-determinism of cache eviction policies from the application's perspective. We can see that only scenarios 1) and 4) meet the atomicity requirement. However, there is no way to guarantee that scenarios 2) or 3) will not occur. This problem can be addressed by at least some embodiments.

Moreover, this atomicity requirement applies to a range of scenarios for applications that are redesigned to take advantage of persistence in the memory tier. Some examples include: inserting an element in the middle of a linked list (requires pointers to be updated atomically), changing connected fields in a struct or arrays, binary tree insertions, etc.

Furthermore, applications are trending to scale out and solutions such as distributed shared memory and disaggregated architectures are emerging. This implies that memory may often be remote to the processor (over a network link or even across a switch or hub). In such architectures, the likelihood of some store operations reaching persistence at different times than others increases even more (due to potential network delays, congestion, adaptive routing, etc.). Therefore the atomicity requirement needs to work across the network as well.

Improvements in fabric and interconnect technology have resulted in the potential for Distributed Shared Memory (DSM) systems to meet the goals for enterprise and big data applications. With fabric latencies projected to reach within an order of memory latencies, a distributed shared memory system can offer a large, single address space to a cluster of servers on a fabric; thus, offering a scalable, cost-efficient alternative to "scale-up" node-controller systems. Unfortunately, for some implementations, software has to maintain complex redo and redo logging in order to offer such functionality.

By contrast, an embodiment extends fabric architectures (e.g., by offering a very dynamic architecture and/or with many different points of failure) to provide a generic mechanism to allow applications to specify that many writes to remote memory are to be done at once or atomically. To provide such a solution, an embodiment provides a novel architecture.

As discussed herein, the following are some architectural definitions: Caching Agents (CAs) are the coherency agents within a node that process memory requests from the processor cores within the same node. In current architectures, cores may use the Request Queue structure to store on-die interconnect requests that are send to the CA, for example, including all the different load requests that a core has sent to the CA. In turn, Home Agents (HA) are the node clusters (or more generally nodes) that are responsible of processing memory requests from the Caching Agents (also referred to herein as "CHA") and act as a home for part of the memory address space (e.g., where one die can have multiple homes having a distributed address space mapping). Depending on the address space that requests are targeting, they may go to the same node's local memory, they may go an interconnect (such as the Unified Path Interconnect (UPI) agent, formerly called QPI (QuickPath Interconnect)) to route the request to the other processors within the same coherent domain, they may go to processors through the Host Fabric Interface (HFI) that can be outside the coherent domain, etc. All the processors coupled through the (e.g., UPI) interconnect are considered to belong to the same coherent domain. One system can be composed by one or more coherent domains, e.g., all being in the coherent domains coupled through the fabric interconnect.

As discussed herein, a coherent domain generally refers to a domain in a coherent memory. Moreover, memory coherence generally refers to a condition in which corresponding memory locations for each processing element in a multi-core processor contains the same cached data. Without memory coherence, programs can be adversely affected. In multi-core processors, two or more processing elements work concurrently. Once in a while they will simultaneously access the same memory location. As long as no processing element alters the data at the affected location, all of those elements can share and cache the data without any problems. But, if one of the processing elements changes the data in the shared location and does not inform the others of the change, the other elements might use the outdated version of the data that remains in their local caches. In a multi-core processing system, a so-called memory coherence protocol notifies all the processing elements of changes to shared values, ensuring that all copies of the data remain consistent.

For example, HPC (High Performance Computing) systems or Data Centers may be composed by N clusters or servers that can communicate with each other using such a fabric. Using the fabric (such as Omni-Path™ fabric), each coherent domain can expose some address regions to the other coherent domains. This is shown in FIG. 2B which illustrates a block diagram of a data center or HPC architecture with multiple nodes, according to an embodiment.

Figure 2B:
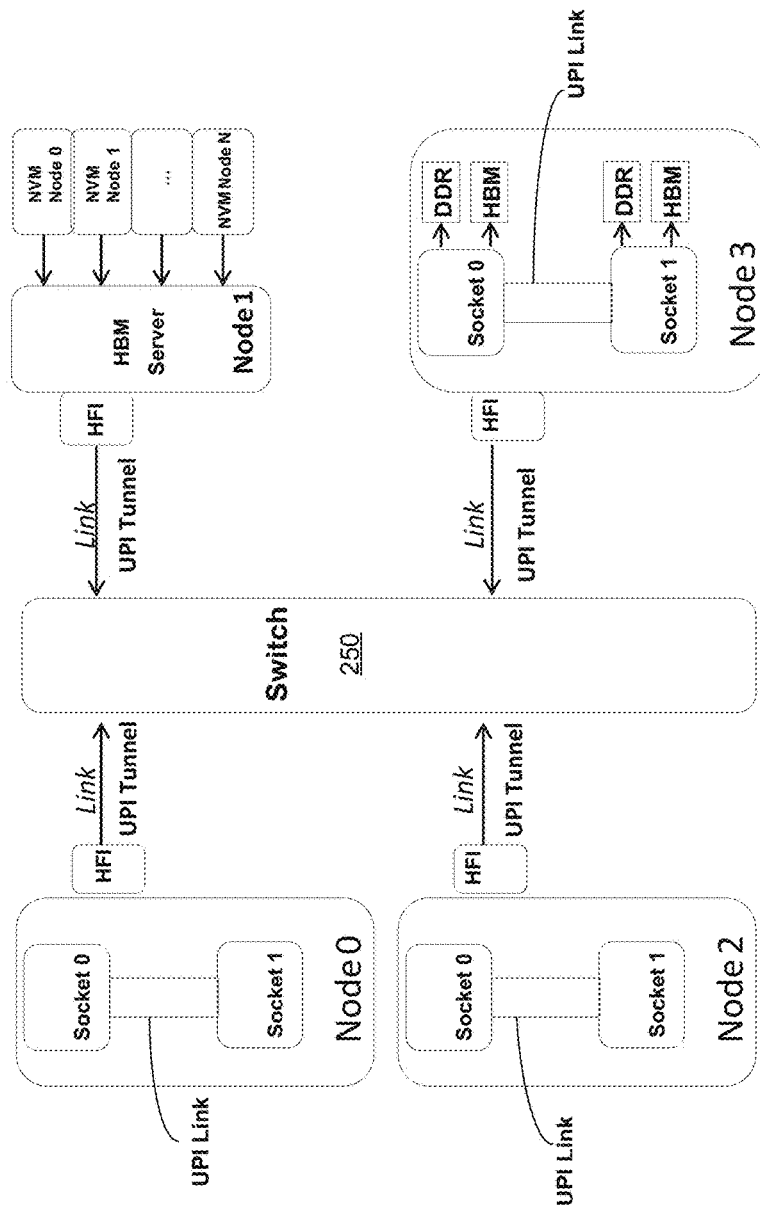
FIG. 2B illustrates a block diagram of a data center or HPC architecture with multiple nodes, according to an embodiment.

Using the fabric of FIG. 2B (including a switch), each coherent domain can expose some address regions to the other coherent domains. However, accesses between different coherent domains are not coherent. The fabric of FIG. 2B allows mapping address of memory ranges between different coherent domains. Memories between nodes can be also exposed by using existing fabric or Ethernet based protocols such as RDMA (Remote Directory Memory Access) or RoCE (RDMA over Converged Ethernet). In any case, any access to remote memory will be transformed to fabric get and put commands. As shown in FIG. 2B, each of the nodes 0, 2, and 3 include two sockets (coupled via a link such as UPI link). While FIG. 2B shows two sockets for each node, more or less sockets may be used in various embodiments. Each node communicates with a switch logic 250 via an interface such as an HFI, e.g., using a tunnel and/or load/store semantics. While some embodiments are discussed herein with reference to HFI, other types of interfaces may be used (such as an Ethernet card/interface). Node 1 is an (e.g., HBM or High Bandwidth Memory) memory server (e.g., using NVM devices such as those discussed herein, including for example, a 3-Dimensional Cross Point Memory). Also, the memory server may be coupled to a plurality of other memory servers (labeled as nodes 1 to N in FIG. 2B). As shown, Node 3 may also have access to Double Data Rate (DDR) and/or HBM compliant memory in an embodiment.

Some embodiments extend on-die architecture to provide ways to atomically bind a set of remote write operations to a "transaction". As discussed herein, the term "transaction" hereinafter implies an atomic operation (the "all or nothing" operation) and not the conventional software transaction. Some embodiments include the following features:
  (a) provide a new mechanism for the software stack to specify that a given set of stores or puts are bound to one transaction. Writes will be written to remote persistent memory once the transaction is released.
  (b) extend on-die interconnect flows to be able to bind writes to remote memory (using regular stores or puts) to the provided transaction.
  (c) extend the fabric put commands payload to specify that the current write is bound to a transaction; thereby, it can only be written in the persistent memory of the remote node.
  (d) extend the HFI to store all the puts associated with a given transaction in an intermediate persistent buffer and store (e.g., all of them) in persistent memory once the transaction is finished.
  (e) extend the HFI to expose an interface to the threads running in the remote (target) node to protect a memory range to avoid reading inconsistent data for a memory range being copied from the HFI buffer to the persistent memory.

Some embodiments extend the processor architecture to be able to: (1) bind a set of stores (targeting an address space that is bound to an address space mapped to a remote memory) to one transaction (in this first scenario, applications access to remote memory using regular memory stores); and/or (2) bind a set of puts (interchangeably referred to herein as writes or stores) targeting a remote node using RDMA or similar protocols (e.g., Direct Data Placement (DDP)) to one transaction (in this second scenario, remote memory is accessed using put and gets (interchangeably referred to herein as reads or loads) fabric semantics). To support both scenarios, the Instruction Set Architecture or ISA (e.g., x86 ISA, ARM ISA, or other ISA) is extended to provide two new instructions to respectively start and end a set of puts with an identifier (ID) and target node, for example having the following syntax:
  wgstart ID, target
  #set of puts or writes/stores
  wgend ID Moreover, the first instruction (wgstart) specifies that (e.g., all) writes or puts targeting the remote target node that are issued from a specific thread are bound to the provided transaction ID. The writes cannot be written to persistent memory in the target node until the second command wgend is executed. This release instruction is provided after the last write or put of the transaction.

In various embodiments, the format of the instruction could vary depending on the final implementation in the hardware. For example, similar to what is done with puts and gets, the target ID could be written to DRAM or volatile memory, a descriptor pointing to this memory location would be provided to the HFI and the HFI would access to the target ID using DRAM reads. The ID stands for a unique identifier that bounds the set of writes for the thread ID and process to a transaction. In one embodiment, it is assumed that this ID is provided by the software stack. However, the ID could automatically by computed (e.g., by hardware logic) by using a hardware ID and counters. The VTd (Virtualization Technology for directed Input/Output (I/O or IO)) information could also be used to support virtualization. The wgend instruction indicates the end of the transaction.

Figure 2C:
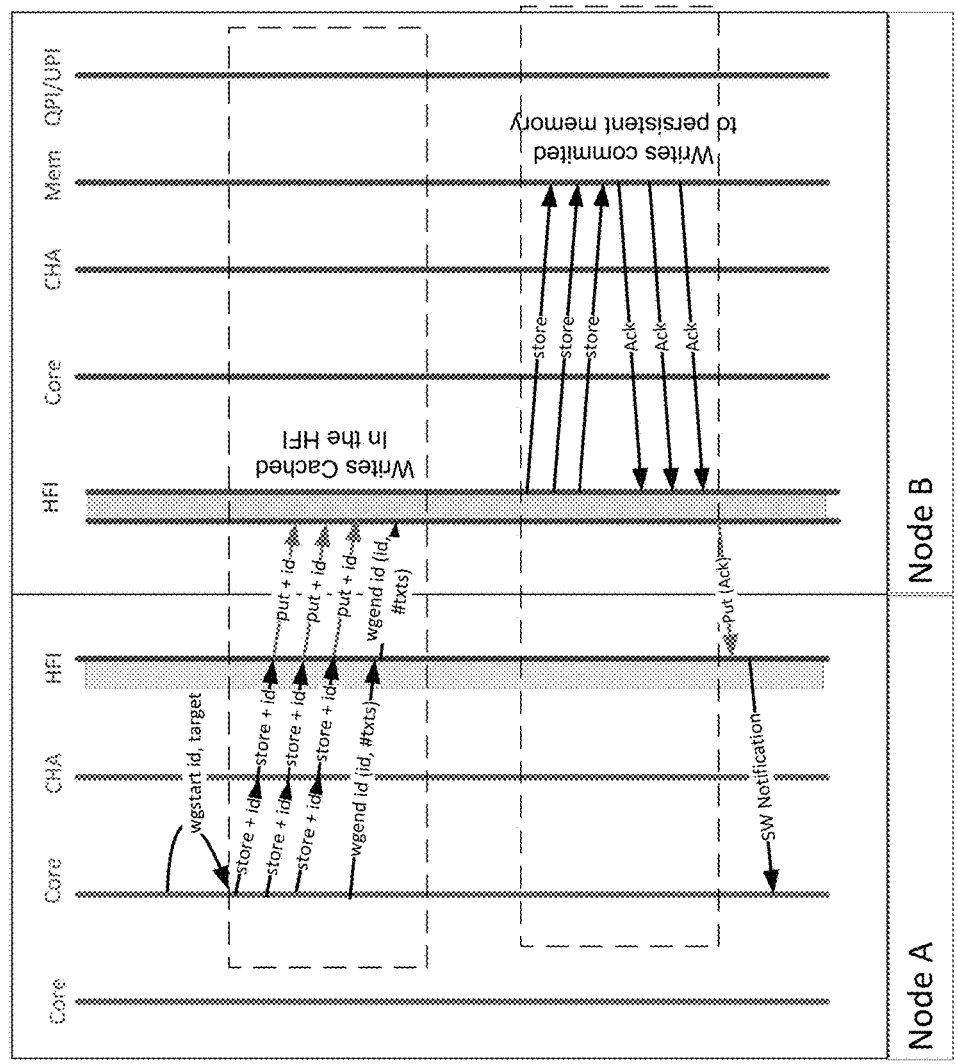
FIGS. 2C, 2D, and 2E illustrate flow diagrams in accordance with some embodiments.
Figure 2D:
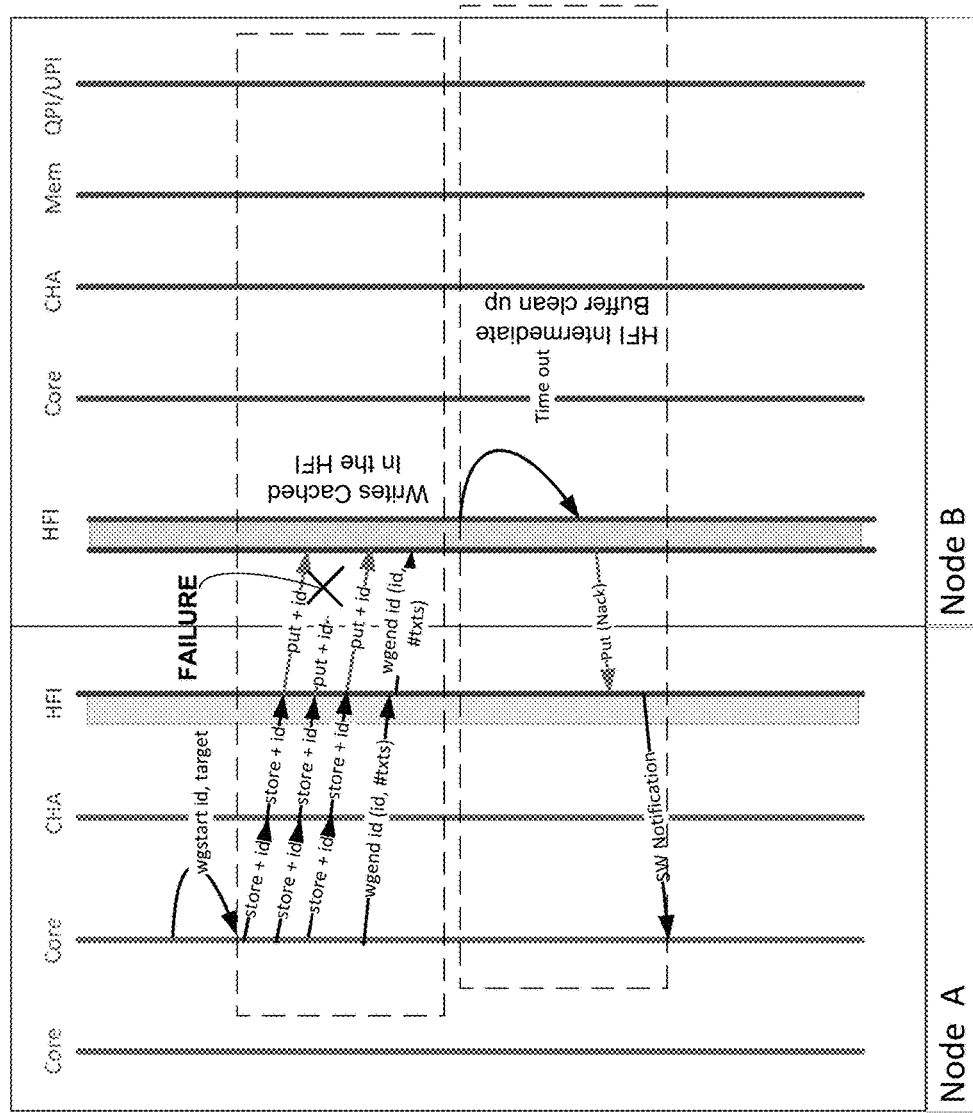
Figure 2E:
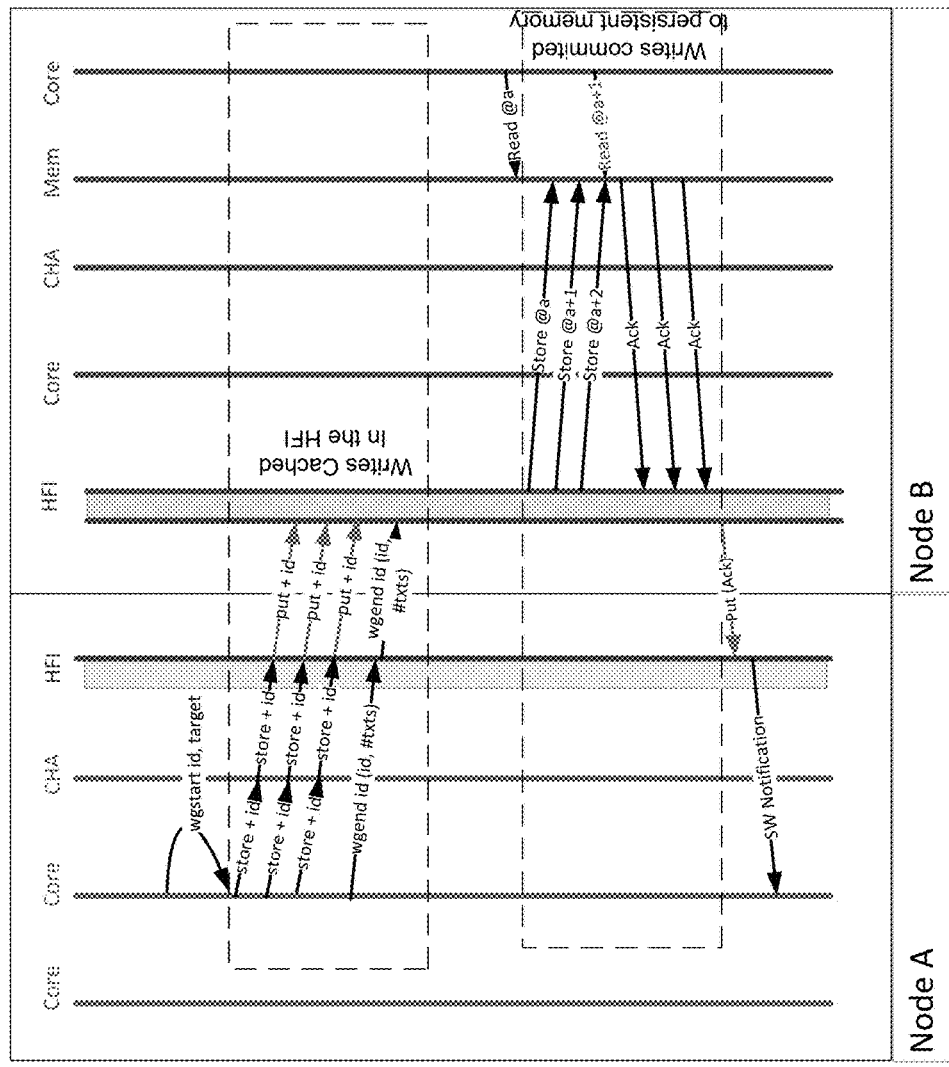

FIGS. 2C, 2D, and 2E illustrate flow diagrams in accordance with some embodiments. In FIGS. 2C-2E, SW refers to software and Ack refers to acknowledge. More particularly, FIG. 2C depicts how the ODI (On-Die Interconnect) and/or fabric flows are implemented to support some embodiments (where no failure occurs and the flow is successful).

Referring to FIG. 2C, once the core executes the wgstart instruction, the cores stores in the Mapping Table (e.g., with one entry per thread) that the given thread is issuing writes bound to the transaction ID. The Mapping Table may be stored in any of the storage/memory devices discussed herein (e.g., with reference to FIGS. 1, 2A, and/or 3-5). After the wgstart instruction is executed, the thread will start issuing the set of writes associated with the transaction. For each of these write operations: (a) core accesses the Mapping Table to get the transaction ID bound to the write (if any). In case that the write is bound to a transaction ID (e.g., using the In-Die Interface (IDI)), it generates an extended write command to CHA that includes the regular write payload plus the ID for the transaction; (b) CHA sends the request to the HFI (also including the identifier). The HFI converts the regular write to a fabric put and sends it to the remote node; and (c) once the remote HFI receives the put, it identifies that the put is associated with the transaction ID. Hence, instead of writing it to persistent memory, the operations causes storage of the address and payload to an intermediate buffer that may be implemented as a content addressable memory, e.g., to be indexed by the transaction ID. In an embodiment the intermediate buffer is in DRAM or persistent memory (e.g., HFI, NVM, NVRAM (Non-Volatile RAM), a (e.g., small) cache, etc.).

After the N stores associated with the transaction are executed by the core, the thread executes the "wgend ID". In response to receipt of "wgend ID" instruction:

(a) the core clears the Mapping Table for the specific thread and transaction ID;
(b) the core (e.g., using the IDI) generates a wgend command that notifies that the transaction is finished. This command may specify the number of writes that the remote HFI has to expect before flushing/dumping the stores to memory. Some embodiments do not assume ordering in the fabric; however, depending on the routing scheme, this part could be simplified;
(c) the transaction reaches the CHA and it is forwarded to the HFI;
(d) the HFI, similarly, using an extended put command, may generate the put transaction to the remote HFI with: ID, release bit, and the number of transactions;
(e) once the HFI receives the command, HFI checks if all the received puts associated with the transaction ID match to "#txts". In the affirmative case (i.e., all the received puts associated with the transaction ID match to "#txts", the following can occur. HFI flushes/dumps all the associated writes stored in the intermediate buffer to persistent memory; clears the corresponding entries from this intermediate buffer; and once all the acknowledgments are collected from persistent memory, it generates a datagram message back to the requestor to indicate that the transaction has been successfully finished.

In the negative case (i.e., all the received puts associated with the transaction ID do not match to "#txts"), the following can occur. HFI sets a timeout counter to wait for the remaining stores to arrive. When it reaches 0, it sends a Nack (or not acknowledge) to the originator HFI and clears the intermediate buffer in the same way as described in the previous point. A flow showing a negative case, is presented in FIG. 2D. In this example, the second put fails (for example due to a hardware failure of one of the switches) because transaction ID of the second put does not match to "#txts". After the transaction finalization is indicated to the target HFI and the timeout is triggered, the HFI generates and artificial Nack back to the originator HFI, the HFI notifies to the software stack that the transaction failed. Hence, software can assume that none of the transactions were committed to persistent memory.

Furthermore, various embodiments can work with ordered flows, where node to target node use the same path in the fabric interconnect (e.g., using the same virtual channel and no adaptive routing). But, some embodiments also support un-ordered writes by the fact that the last command (wgend) specifies the number of writes that the HFI should receive before writing the many writes to persistent memory and sending back the acknowledgement. The described flow provides for the usage of load/store (ld/st) semantics to access to remote memory to simplify the description and length. However, the described flow can be mapped into the current on-die interconnect flows for put/get fabric semantics.

For simplification, other corner cases could also cause a fault, such as: writes bound to a transaction do not target the same target node or do not target the local HFI (e.g., local DRAM/volatile memory). Moreover, the flow and architecture could be simplified if we assume only put/get semantics instead of regular ld/st semantics. For example, the put and get commands memory descriptors could store the transaction ID and the other information conveyed in the stores in the described example. Conceptually, they would follow the same structure. No changes are required in the coherency flows or in CHA pipelines algorithms, only to support conveying the new information. The ID transaction can be unique or big enough to be sure that writes associated with cancel or failed transactions arriving late do not interfere with ongoing transactions by not having the same ID transaction.

In an embodiment, each entry in the intermediate buffer to the HFI has a "time to leave" counter. Once this time to leave counter reaches zero (or otherwise expires) the entry is removed from the mapping table. The goal is to be sure that an orphan transaction does not occupy the buffer forever when its parent transactions was canceled and removed from the buffer due to timeout before it arrived at the HFI.

In some embodiments, e.g., as mentioned above, three main changes would be made to the HFI: (1) extend the architecture to support the generation and processing of the new put command; (2) extend the architecture to include the intermediate buffer and the logic corresponding to transaction finalization and timeouts; and (3) extend the architecture to implement notifications to the software stack (e.g., to the proper thread) on the response from the target HFI (the previous presented Ack or Nack). In order to be fault tolerant, the intermediate buffer may be implemented using persistent memory storage. Hence, in case of power outage or other kinds of transient failure, data that started to be copied to the main persistent memory would survive. Hardware logic may expose a mechanism to the software logic/stack to access this buffer, and take a corresponding action in case of power outage occurrence(s).

Additionally, with the described architecture, it is possible that in the process of flushing/dumping the transactional writes stored in the buffer another process in the local or a remote node tries to access the memory range being flushed/dumped. This could lead to consistency problems. FIG. 2E shows a flow in accordance with an embodiment that tries to exemplify this scenario. In this scenario, it is assumed that the buffer contains a database object that is composed by [@a,@a+2]. When the requestor mode finishes the transaction and the HFI starts flushing/dumping the buffer to persistent memory, another thread in the local node has already started reading the object. In this example, the local thread would read the old @a and not the new @a+1 and @a+2. This would result in the local thread having an inconsistent (corrupt) view of the object.

To mitigate this problem, two solutions may be used:
(1) a pure software-based approach may be used where it is assumed that the consistency is basically addressed at system level. Thus, the software is responsible to implement locking mechanisms to be sure that no corruption or consistency problems occur. In one embodiment, the requestor could register (at software level) an exclusive access to the given address range and release it once the requester receives acknowledgement from the target node.
(2) a hybrid software/hardware based approach may be used, where the target HFI exposes a registration mechanism to protect specific address ranges. In this embodiment, the functionality described herein is applied to a specific memory DRAM/volatile address range. If a local thread needs to access to a sub-set of this range, it registers its access to the HFI and releases it once done. The HFI would not flush/dump any transactions that conflict with any registration done. In other words, the HFI would not flush/dump any transactions for a range that has registered access. A similar approach may also be used by remote requests targeting this address range.

As mentioned above, at least some embodiments provide new hardware and new software interface(s) that allow fair and/or flexible provisioning of memory bandwidths in multiple domains and/or Non-Uniform Memory Access (NUMA) systems. Such techniques may be used to support successful adoption of emerging memory technologies and fabric technologies that provide access to remote memory devices/nodes via memory semantics. Moreover, without some embodiments, such scenarios can result in serious performance degradations, e.g., due to bandwidth throttling.

Figure 3:
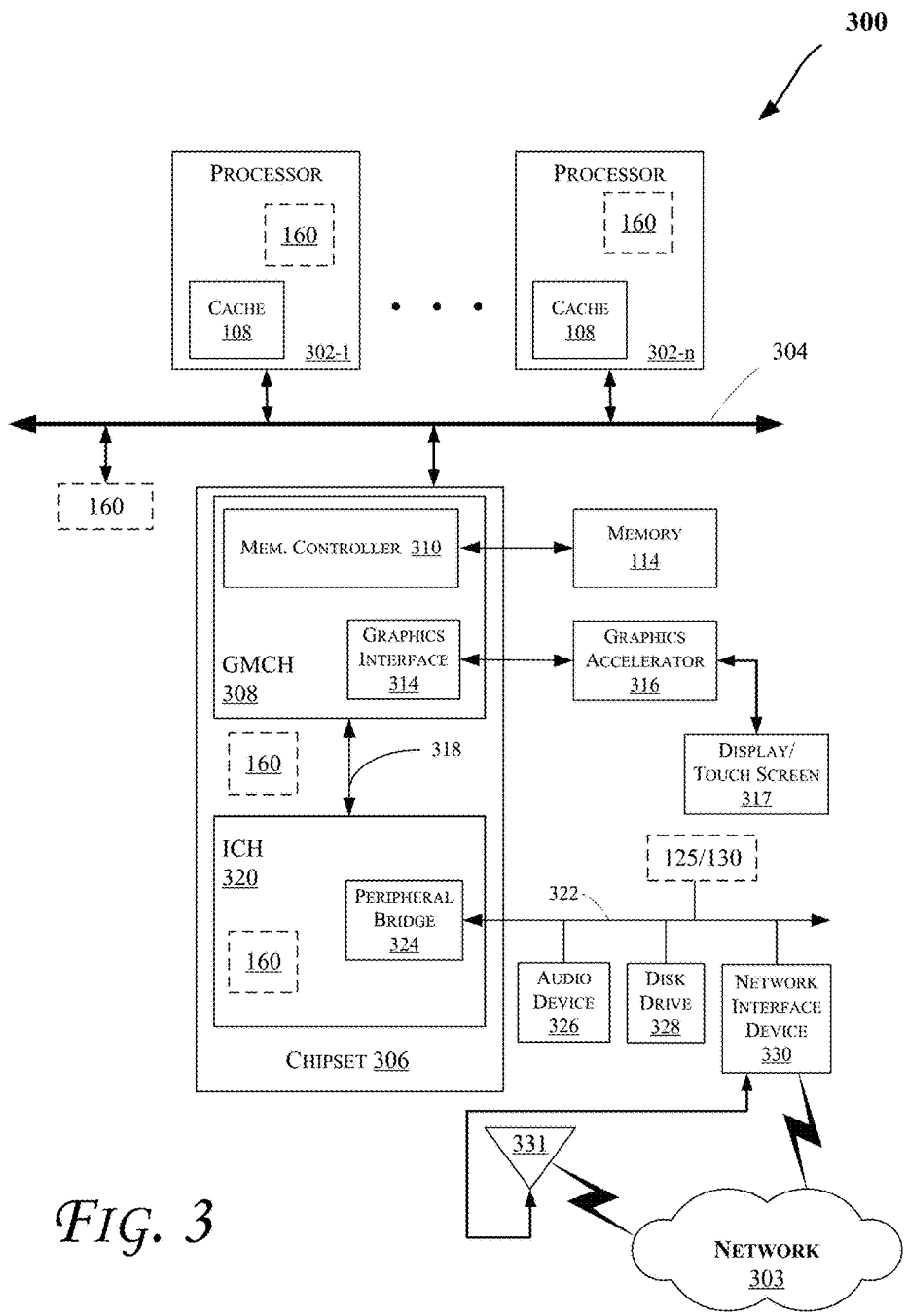

FIG. 3 illustrates a block diagram of a computing system 300 in accordance with an embodiment. The computing system 300 may include one or more central processing unit(s) (CPUs) 302 or processors that communicate via an interconnection network (or bus) 304. The processors 302 may include a general purpose processor, a network processor (that processes data communicated over a computer network 303), an application processor (such as those used in cell phones, smart phones, etc.), or other types of a processor (including a reduced instruction set computer (RISC) processor or a complex instruction set computer (CISC)).

Various types of computer networks 303 may be utilized including wired (e.g., Ethernet, Gigabit, Fiber, etc.) or wireless networks (such as cellular, including 3G (Third-Generation Cell-Phone Technology or 3rd Generation Wireless Format (UWCC)), 4G (Fourth-Generation Cell-Phone Technology), 4G Advanced, Low Power Embedded (LPE), Long Term Evolution (LTE), LTE advanced, etc.). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

In an embodiment, one or more of the processors 302 may be the same or similar to the processors 102 of FIG. 1. For example, one or more of the processors 302 may include one or more of the cores 106 and/or processor cache 108. Also, the operations discussed with reference to FIGS. 1-2E may be performed by one or more components of the system 300.

A chipset 306 may also communicate with the interconnection network 304. The chipset 306 may include a graphics and memory control hub (GMCH) 308. The GMCH 308 may include a memory controller 310 (which may be the same or similar to the memory controller 120 of FIG. 1 in an embodiment) that communicates with the memory 114. The memory 114 may store data, including sequences of instructions that are executed by the CPU 302, or any other device included in the computing system 300. Also, system 300 includes logic 125/160 and/or NVM 130 in various locations such as shown or not shown. In one embodiment, the memory 114 may include one or more volatile memory devices such as random access memory (RAM), dynamic RAM (DRAM), synchronous DRAM (SDRAM), static RAM (SRAM), or other types of memory devices. Non-volatile memory may also be utilized such as a hard disk drive, flash, etc., including any NVM discussed herein. Additional devices may communicate via the interconnection network 304, such as multiple CPUs and/or multiple system memories.

The GMCH 308 may also include a graphics interface 314 that communicates with a graphics accelerator 316. In one embodiment, the graphics interface 314 may communicate with the graphics accelerator 316 via an accelerated graphics port (AGP) or Peripheral Component Interconnect (PCI) (or PCI express (PCIe) interface). In an embodiment, a display 317 (such as a flat panel display, touch screen, etc.) may communicate with the graphics interface 314 through, for example, a signal converter that translates a digital representation of an image stored in a memory device such as video memory or system memory into display signals that are interpreted and displayed by the display. The display signals produced by the display device may pass through various control devices before being interpreted by and subsequently displayed on the display 317.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330 (which is in communication with the computer network 303, e.g., via a wired or wireless interface). As shown, the network interface device 330 may be coupled to an antenna 331 to wirelessly (e.g., via an Institute of Electrical and Electronics Engineers (IEEE) 802.11 interface (including IEEE 802.11a/b/g/n/ac, etc.), cellular interface, 3G, 4G, LPE, etc.) communicate with the network 303. Other devices may communicate via the bus 322. Also, various components (such as the network interface device 330) may communicate with the GMCH 308 in some embodiments. In addition, the processor 302 and the GMCH 308 may be combined to form a single chip. Furthermore, the graphics accelerator 316 may be included within the GMCH 308 in other embodiments.

Furthermore, the computing system 300 may include volatile and/or nonvolatile memory. For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
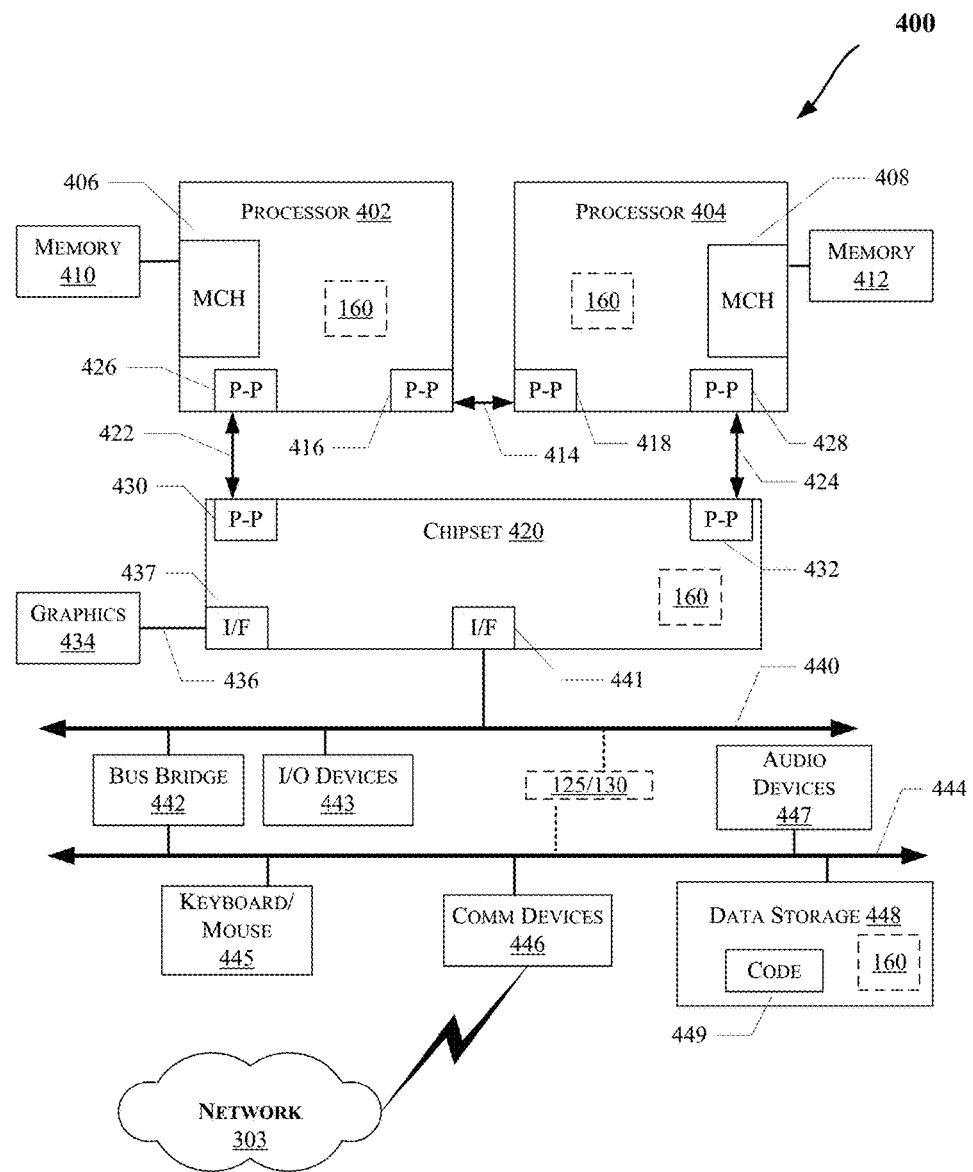

FIG. 4 illustrates a computing system 400 that is arranged in a point-to-point (PtP) configuration, according to an embodiment. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 114 of FIGS. 1 and/or 3. Also, MCH 406 and 408 may include the memory controller 120 in some embodiments. Furthermore, system 400 includes logic 125/160 and/or NVM 130 in various locations such as shown or not shown. The logic 125/160 and/or NVM 130 may be coupled to system 400 via bus 440 or 444, via other point-to-point connections to the processor(s) 402 or 404 or chipset 420, etc. in various embodiments.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437. As discussed with reference to FIG. 3, the graphics interface 436 may be coupled to a display device (e.g., display 317) in some embodiments.

In one embodiment, one or more of the cores 106 and/or processor cache 108 of FIG. 1 may be located within the processors 402 and 404 (not shown). Other embodiments, however, may exist in other circuits, logic units, or devices within the system 400 of FIG. 4. Furthermore, other embodiments may be distributed throughout several circuits, logic units, or devices illustrated in FIG. 4.

The chipset 420 may communicate with a bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303, as discussed with reference to network interface device 330 for example, including via antenna 331), audio I/O device, and/or a data storage device 448. The data storage device 448 may store code 449 that may be executed by the processors 402 and/or 404.

Figure 5:
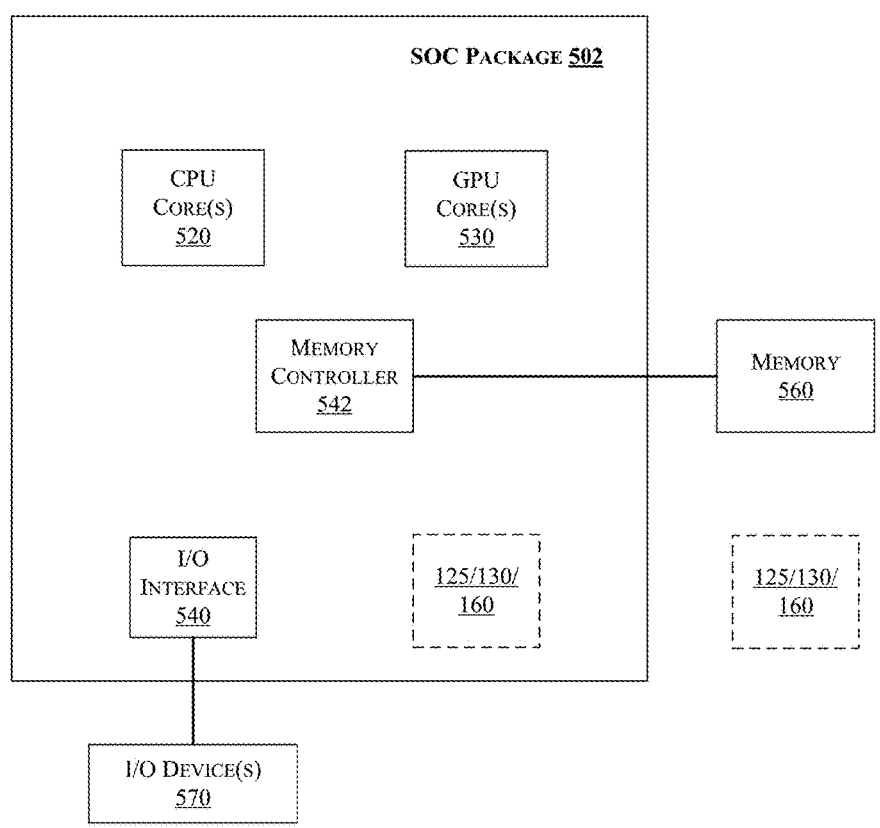

In some embodiments, one or more of the components discussed herein can be embodied as a System On Chip (SOC) device. FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged onto a single semiconductor device.

As illustrated in FIG. 5, SOC package 502 is coupled to a memory 560 (which may be similar to or the same as memory discussed herein with reference to the other figures) via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like. Furthermore, SOC package 502 may include/integrate items 125, 130, and/or 160 in an embodiment. Alternatively, items 125, 130, and/or 160 may be provided outside of the SOC package 502 (i.e., as a discrete logic).

Embodiments described herein can be powered by a battery, wireless charging, a renewal energy source (e.g., solar power or motion-based charging), or when connected to a charging port or wall outlet.

The following examples pertain to further embodiments. Example 1 includes an apparatus comprising: or any other example discussed herein, non-volatile memory to store data corresponding to a plurality of write operations; and or any other example discussed herein, a first node to comprise logic, at least a portion of which is in hardware, to perform one or more operations, in response to the plurality of write operations, to cause storage of the data at a second node atomically, or any other example discussed herein, wherein the logic is to atomically bind the plurality of write operations to a transaction, wherein the data is written to the non-volatile memory in response to release of the transaction. Example 2 includes the apparatus of example 1 or any other example discussed herein, wherein the second node is to be coupled to one or more non-volatile memory nodes. Example 3 includes the apparatus of any one of examples 1-2 or any other example discussed herein, wherein each of the first node or the second node is to comprise one or more sockets. Example 4 includes the apparatus of any one of examples 1-3 or any other example discussed herein, wherein at least one of the one or more sockets of the first node or the second node is to be coupled to a volatile memory or a high bandwidth memory. Example 5 includes the apparatus of any one of examples 1-4 or any other example discussed herein, wherein the first node is in a first domain and the second node is in a second domain. Example 6 includes the apparatus of any one of examples 1-5 or any other example discussed herein, wherein the first domain and the second domain are to form a Non-Uniform Memory Access (NUMA) system. Example 7 includes the apparatus of any one of examples 1-6 or any other example discussed herein, wherein the first node is to be coupled to the second node via a network link. Example 8 includes the apparatus of any one of examples 1-7 or any other example discussed herein, wherein the network link is to communicate the data via a switch. Example 9 includes the apparatus of any one of examples 1-8 or any other example discussed herein, wherein the switch is to communicate with the first node or the second node via a Host Fabric Interface (HFI). Example 10 includes the apparatus of any one of examples 1-9 or any other example discussed herein, wherein the switch is to communicate with the first node or the second node via a Unified Path Interconnect (UPI) tunnel or QuickPath Interconnect (QPI) tunnel. Example 11 includes the apparatus of any one of examples 1-10 or any other example discussed herein, wherein the logic is to atomically bind the plurality of write operations to the transaction in response to a first instruction. Example 12 includes the apparatus of any one of examples 1-11 or any other example discussed herein, wherein the first instruction is to indicate an identifier and a target node. Example 13 includes the apparatus of any one of examples 1-12 or any other example discussed herein, wherein the transaction is to be released in response to a second instruction. Example 14 includes the apparatus of any one of examples 1-13 or any other example discussed herein, wherein the second instruction is to indicate an identifier. Example 15 includes the apparatus of any one of examples 1-14 or any other example discussed herein, wherein the non-volatile memory is to be coupled to a two-level system main memory to at least temporarily store a portion of the data. Example 16 includes the apparatus of any one of examples 1-15 or any other example discussed herein, wherein the non-volatile memory is to comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption. Example 17 includes the apparatus of any one of examples 1-16 or any other example discussed herein, comprising one or more of: at least one processor, having one or more processor cores, communicatively coupled to the non-volatile memory, a battery communicatively coupled to the apparatus, or a network interface communicatively coupled to the apparatus.

Example 18 includes a method comprising: or any other example discussed herein, storing data corresponding to a plurality of write operations in non-volatile memory; and or any other example discussed herein, performing, at a first node, one or more operations, in response to the plurality of write operations, to cause storage of the data at a second node atomically, or any other example discussed herein, wherein the one or more operations atomically bind the plurality of write operations to a transaction, wherein the data is written to the non-volatile memory in response to release of the transaction. Example 19 includes the method of example 18 or any other example discussed herein, further comprising coupling the second node to one or more non-volatile memory nodes. Example 20 includes the method of any one of examples 18-19 or any other example discussed herein, further comprising coupling the first node and the second node via a network link. Example 21 includes the method of any one of examples 18-20 or any other example discussed herein, further comprising a network link coupling the first node and the second node via a switch. Example 22 includes the method of any one of examples 18-21 or any other example discussed herein, further comprising atomically binding the plurality of write operations to the transaction in response to a first instruction. Example 23 includes the method of any one of examples 18-22 or any other example discussed herein, further comprising releasing the transaction in response to a second instruction. Example 24 includes a computer-readable medium comprising one or more instructions that when executed on a processor configure the processor to perform one or more operations of any one of examples 18 to 23. Example 25 includes an apparatus comprising means to perform a method as set forth in any one of examples 18 to 23.

Example 26 includes a computing system comprising: or any other example discussed herein, a processor coupled to non-volatile memory, wherein the non-volatile memory is to store data corresponding to a plurality of write operations; and or any other example discussed herein, a first node to comprise logic to perform one or more operations, in response to the plurality of write operations, to cause storage of the data at a second node atomically, or any other example discussed herein, wherein the logic is to atomically bind the plurality of write operations to a transaction, wherein the data is written to the non-volatile memory in response to release of the transaction. Example 27 includes the system of example 26 or any other example discussed herein, wherein the second node is to be coupled to one or more non-volatile memory nodes. Example 28 includes the system of any one of examples 26-27 or any other example discussed herein, wherein each of the first node or the second node is to comprise one or more sockets. Example 29 includes the system of any one of examples 26-28 or any other example discussed herein, wherein at least one of the one or more sockets of the first node or the second node is to be coupled to a volatile memory or a high bandwidth memory. Example 30 includes the system of any one of examples 26-29 or any other example discussed herein, wherein the first node is in a first domain and the second node is in a second domain. Example 31 includes the system of any one of examples 26-30 or any other example discussed herein, wherein the first domain and the second domain are to form a Non-Uniform Memory Access (NUMA) system. Example 32 includes the system of any one of examples 26-31 or any other example discussed herein, wherein the first node is to be coupled to the second node via a network link. Example 33 includes the system of any one of examples 26-32 or any other example discussed herein, wherein the network link is to communicate the data via a switch. Example 34 includes the system of any one of examples 26-33 or any other example discussed herein, wherein the switch is to communicate with the first node or the second node via a Host Fabric Interface (HFI). Example 35 includes the system of any one of examples 26-34 or any other example discussed herein, wherein the switch is to communicate with the first node or the second node via a Unified Path Interconnect (UPI) tunnel or QuickPath Interconnect (QPI) tunnel. Example 36 includes the system of any one of examples 26-35 or any other example discussed herein, wherein the logic is to atomically bind the plurality of write operations to the transaction in response to a first instruction. Example 37 includes the system of any one of examples 26-36 or any other example discussed herein, wherein the first instruction is to indicate an identifier and a target node. Example 38 includes the system of any one of examples 26-37 or any other example discussed herein, wherein the transaction is to be released in response to a second instruction. Example 39 includes the system of any one of examples 26-38 or any other example discussed herein, wherein the second instruction is to indicate an identifier. Example 40 includes the system of any one of examples 26-39 or any other example discussed herein, wherein the non-volatile memory is to be coupled to a two-level system main memory to at least temporarily store a portion of the data. Example 41 includes the system of any one of examples 26-40 or any other example discussed herein, wherein the non-volatile memory is to comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption. Example 42 includes the system of any one of examples 26-41 or any other example discussed herein, comprising one or more of: at least one processor, having one or more processor cores, communicatively coupled to the non-volatile memory, a battery communicatively coupled to the apparatus, or a network interface communicatively coupled to the apparatus.

Example 43 includes an apparatus comprising means to perform a method as set forth in any preceding example. Example 44 comprises machine-readable storage including machine-readable instructions, when executed, to implement a method or realize an apparatus as set forth in any preceding example.

In various embodiments, the operations discussed herein, e.g., with reference to FIGS. 1-5, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a memory device such as those discussed with respect to FIGS. 1-5.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features, numerical values, and/or methodological acts, it is to be understood that claimed subject matter may not be limited to the specific features, numerical values, or acts described. Rather, the specific features, numerical values, and acts are disclosed as sample forms of implementing the claimed subject matter.

The invention claimed is:

1. An apparatus comprising:
   non-volatile memory to store data corresponding to a plurality of write operations; and
   a first node to comprise logic, at least a portion of which is in hardware, to perform one or more operations, in response to the plurality of write operations, to cause storage of the data at a second node atomically,
   wherein the logic is to atomically bind the plurality of write operations to a transaction in response to a first instruction that indicates an identifier of the transaction and an identifier of the second node, and to release the transaction in response to a second instruction that indicates the identifier of the transaction, wherein the data is written to the non-volatile memory in response to release of the transaction.

2. The apparatus of claim 1, wherein the second node is to be coupled to one or more non-volatile memory nodes.

3. The apparatus of claim 1, wherein each of the first node or the second node is to comprise one or more sockets.

4. The apparatus of claim 3, wherein at least one of the one or more sockets of the first node or the second node is to be coupled to a volatile memory or a high bandwidth memory.

5. The apparatus of claim 1, wherein the first node is in a first domain and the second node is in a second domain.

6. The apparatus of claim 5, wherein the first domain and the second domain are to form a Non-Uniform Memory Access (NUMA) system.

7. The apparatus of claim 1, wherein the first node is to be coupled to the second node via a network link.

8. The apparatus of claim 7, wherein the network link is to communicate the data via a switch.

9. The apparatus of claim 8, wherein the switch is to communicate with the first node or the second node via a Host Fabric Interface (HFI).

10. The apparatus of claim 8, wherein the switch is to communicate with the first node or the second node via a Unified Path Interconnect (UPI) tunnel or QuickPath Interconnect (QPI) tunnel.

11. The apparatus of claim 1, wherein the non-volatile memory is to be coupled to a two-level system main memory to at least temporarily store a portion of the data.

12. The apparatus of claim 1, wherein the non-volatile memory is to comprise one or more of: nanowire memory, Ferro-electric Transistor Random Access Memory (Fe-TRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption.

13. The apparatus of claim 1, comprising one or more of: at least one processor, having one or more processor cores, communicatively coupled to the non-volatile memory, a battery communicatively coupled to the apparatus, or a network interface communicatively coupled to the apparatus.

14. A method comprising:
storing data corresponding to a plurality of write operations in non-volatile memory; and
performing, at a first node, one or more operations, in response to the plurality of write operations, to cause storage of the data at a second node atomically,
wherein the one or more operations atomically bind the plurality of write operations to a transaction in response to a first instruction that indicates an identifier of the transaction and an identifier of the second node, and to release the transaction in response to a second instruction that indicates the identifier of the transaction, wherein the data is written to the non-volatile memory in response to release of the transaction.

15. The method of claim 14, further comprising coupling the second node to one or more non-volatile memory nodes.

16. The method of claim 14, further comprising coupling the first node and the second node via a network link.

17. The method of claim 14, further comprising a network link coupling the first node and the second node via a switch.

* * * * *